(12) United States Patent
Kalliola

(10) Patent No.: US 8,799,123 B2
(45) Date of Patent: Aug. 5, 2014

(54) METHOD AND A SYSTEM FOR DELIVERING MESSAGES

(75) Inventor: Janne Kalliola, Espoo (FI)

(73) Assignee: Apple Inc., Cupertiono, CA (US)

(*) Notice: Subject to any disclaimer, the term of this patent is extended or adjusted under 35 U.S.C. 154(b) by 161 days.

(21) Appl. No.: 13/096,622

(22) Filed: Apr. 28, 2011

(65) Prior Publication Data
US 2011/0202408 A1 Aug. 18, 2011

Related U.S. Application Data

(63) Continuation of application No. 12/157,518, filed on Jun. 11, 2008.

(60) Provisional application No. 60/934,525, filed on Jun. 14, 2007.

(30) Foreign Application Priority Data

Jun. 14, 2007 (GB) .................................. 0711527.2

(51) Int. Cl.
*G06Q 40/00* (2012.01)
(52) U.S. Cl.
USPC ..................... 705/35; 705/14.41; 705/14.49
(58) Field of Classification Search
USPC ...................................... 705/14.41, 35, 14.49
See application file for complete search history.

(56) References Cited

U.S. PATENT DOCUMENTS

| | | | |
|---|---|---|---|
| 4,811,382 A | 3/1989 | Sleevi | |
| 4,935,956 A | 6/1990 | Hellwarth | |
| 5,408,519 A | 4/1995 | Pierce et al. | |
| 5,592,535 A | 1/1997 | Klotz | |
| 5,613,213 A | 3/1997 | Naddell et al. | |

(Continued)

FOREIGN PATENT DOCUMENTS

| | | |
|---|---|---|
| BE | 1015704 | 7/2005 |
| DE | 199 41 461 A1 | 3/2001 |

(Continued)

OTHER PUBLICATIONS

Office Action issued Apr. 29, 2011 by the U.S. Patent Office in related U.S. Appl. No. 12/157,518 (10 pages).

(Continued)

*Primary Examiner* — Lalita M Hamilton
(74) *Attorney, Agent, or Firm* — Novak Druce Connolly Bove + Quigg LLP

(57) ABSTRACT

A system for generating a schedule for use in triggering transmission of message content in a telecommunications network is provided. The system comprises a store for storing profiles of a plurality of recipients, and a plurality of message delivery campaigns with one or more criteria. The campaigns to be executed in relation to a given inventory, which may relate to a predetermined time period, may be arranged into one or more campaign clusters. A suitable allocation method may be used individually for each of said plurality of campaign clusters to allocate, among the plurality of recipients, target recipients for each of the campaign clusters based on campaign criteria and the profiles. The allocation process may be repeated to obtain, for example as high a number of messages as possible with the network resources available without exceeding a predetermined maximum number of messages per any given recipient. After the allocation process is completed, the campaign messages are delivered to the allocated target recipients via a communications network.

27 Claims, 4 Drawing Sheets

(56) References Cited

U.S. PATENT DOCUMENTS

| | | |
|---|---|---|
| 5,678,179 A | 10/1997 | Turcotte et al. |
| 5,752,238 A | 5/1998 | Dedrick |
| 5,978,775 A | 11/1999 | Chen |
| 5,978,833 A | 11/1999 | Pashley et al. |
| 6,023,700 A | 2/2000 | Owens et al. |
| 6,044,259 A | 3/2000 | Hentila |
| 6,097,942 A | 8/2000 | Laiho |
| 6,202,086 B1 | 3/2001 | Maruyama et al. |
| 6,334,145 B1 | 12/2001 | Adams et al. |
| 6,345,279 B1 | 2/2002 | Li et al. |
| 6,408,309 B1 | 6/2002 | Agarwal |
| 6,411,946 B1 | 6/2002 | Chaudhuri |
| 6,639,977 B1 | 10/2003 | Swope et al. |
| 6,647,269 B2 | 11/2003 | Hendrey et al. |
| 6,718,178 B1 | 4/2004 | Sladek et al. |
| 6,889,054 B2 | 5/2005 | Himmel et al. |
| 6,990,330 B2 | 1/2006 | Veerepalli et al. |
| 7,013,125 B2 | 3/2006 | Henrikson et al. |
| 7,027,799 B2 | 4/2006 | Morin et al. |
| 7,072,947 B1 | 7/2006 | Knox et al. |
| 7,149,500 B2 | 12/2006 | Halsell |
| 7,155,243 B2 | 12/2006 | Baldwin et al. |
| 7,164,927 B1 | 1/2007 | Koch et al. |
| 7,280,818 B2 | 10/2007 | Clayton |
| 7,346,630 B2 | 3/2008 | Eichstadt et al. |
| 7,496,362 B2 | 2/2009 | Wolfman |
| 7,529,357 B1 | 5/2009 | Rae et al. |
| 7,925,283 B2 | 4/2011 | Smith et al. |
| 7,945,242 B2 | 5/2011 | Kahn |
| 7,979,314 B2 | 7/2011 | Ulenas |
| 8,046,810 B2 | 10/2011 | Srivastava |
| 2001/0008404 A1 | 7/2001 | Naito et al. |
| 2002/0006803 A1 | 1/2002 | Mendiola et al. |
| 2002/0019829 A1 | 2/2002 | Shapiro |
| 2002/0032602 A1 | 3/2002 | Lanzillo, Jr. et al. |
| 2002/0046341 A1 | 4/2002 | Kazaks et al. |
| 2002/0052788 A1 | 5/2002 | Perkes et al. |
| 2002/0075305 A1 | 6/2002 | Beaton et al. |
| 2002/0077130 A1 | 6/2002 | Owensby |
| 2002/0128908 A1 | 9/2002 | Levin et al. |
| 2002/0137507 A1 | 9/2002 | Winkler |
| 2002/0138291 A1 | 9/2002 | Vaidyanathan et al. |
| 2002/0183040 A1 | 12/2002 | Lundstrom et al. |
| 2003/0003929 A1 | 1/2003 | Himmel et al. |
| 2003/0040297 A1 | 2/2003 | Pecen et al. |
| 2003/0040300 A1 | 2/2003 | Bodic et al. |
| 2003/0076940 A1 | 4/2003 | Manto |
| 2003/0110171 A1 | 6/2003 | Ozer et al. |
| 2003/0126015 A1 | 7/2003 | Chan et al. |
| 2003/0197719 A1 | 10/2003 | Lincke et al. |
| 2003/0208754 A1 | 11/2003 | Sridhar et al. |
| 2004/0103157 A1 | 5/2004 | Requena et al. |
| 2004/0158612 A1 | 8/2004 | Concannon |
| 2004/0180648 A1 | 9/2004 | Hymel |
| 2004/0185827 A1 | 9/2004 | Parks |
| 2004/0192359 A1 | 9/2004 | McRaild et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0240649 A1 | 12/2004 | Goel |
| 2004/0254993 A1 | 12/2004 | Mamas |
| 2004/0259526 A1 | 12/2004 | Goris et al. |
| 2005/0010475 A1* | 1/2005 | Perkowski et al. ............ 705/14 |
| 2005/0027676 A1 | 2/2005 | Eichstaedt et al. |
| 2005/0123111 A1 | 6/2005 | Philbin et al. |
| 2005/0125397 A1 | 6/2005 | Gross et al. |
| 2005/0186940 A1 | 8/2005 | Schatzberger et al. |
| 2005/0228680 A1 | 10/2005 | Malik |
| 2005/0238154 A1 | 10/2005 | Heaton et al. |
| 2005/0239504 A1 | 10/2005 | Ishii et al. |
| 2005/0245241 A1 | 11/2005 | Durand et al. |
| 2005/0273465 A1 | 12/2005 | Kimura |
| 2006/0025163 A1 | 2/2006 | Smith et al. |
| 2006/0031327 A1 | 2/2006 | Kredo |
| 2006/0041470 A1 | 2/2006 | Filho et al. |
| 2006/0048059 A1 | 3/2006 | Etkin |
| 2006/0068845 A1 | 3/2006 | Muller et al. |
| 2006/0069612 A1* | 3/2006 | Hurt et al. ............ 705/14 |
| 2006/0085395 A1 | 4/2006 | Cradick et al. |
| 2006/0117378 A1 | 6/2006 | Tam et al. |
| 2006/0123014 A1 | 6/2006 | Ng |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0252512 A1 | 11/2006 | Walker |
| 2006/0253327 A1 | 11/2006 | Morris et al. |
| 2006/0276170 A1 | 12/2006 | Radhakrishnan et al. |
| 2006/0276213 A1 | 12/2006 | Gottschalk et al. |
| 2006/0286962 A1 | 12/2006 | Davis |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004380 A1 | 1/2007 | Ylkoski |
| 2007/0016488 A1 | 1/2007 | Ulenas |
| 2007/0033104 A1 | 2/2007 | Collins et al. |
| 2007/0038711 A1 | 2/2007 | MacBeth et al. |
| 2007/0055565 A1 | 3/2007 | Baur et al. |
| 2007/0074262 A1 | 3/2007 | Kikkoji et al. |
| 2007/0077911 A1 | 4/2007 | Raman |
| 2007/0100805 A1 | 5/2007 | Ramer et al. |
| 2007/0174295 A1 | 7/2007 | Abraham et al. |
| 2007/0232300 A1 | 10/2007 | Wolfman |
| 2007/0237330 A1 | 10/2007 | Srivastava |
| 2008/0057917 A1 | 3/2008 | Oria |
| 2008/0057920 A1 | 3/2008 | Pettit et al. |
| 2008/0075249 A1 | 3/2008 | Zach |
| 2008/0086369 A1 | 4/2008 | Kiat et al. |
| 2008/0125080 A1 | 5/2008 | Phillips |
| 2008/0215436 A1 | 9/2008 | Roberts |
| 2009/0075627 A1 | 3/2009 | Hwang |
| 2009/0141875 A1 | 6/2009 | Demmitt et al. |

FOREIGN PATENT DOCUMENTS

| | | |
|---|---|---|
| EP | 1 073 293 A1 | 1/2001 |
| EP | 1 109 371 A2 | 6/2001 |
| EP | 1 161 093 A2 | 12/2001 |
| EP | 1 193 955 A2 | 4/2002 |
| EP | 1 220 132 A2 | 7/2002 |
| EP | 1 239 395 A2 | 9/2002 |
| EP | 1 253 542 A2 | 10/2002 |
| EP | 1249995 | 10/2002 |
| EP | 1280087 | 1/2003 |
| EP | 1 298 945 A1 | 4/2003 |
| EP | 1320214 | 6/2003 |
| EP | 1 324 250 A1 | 7/2003 |
| EP | 1 365 604 A2 | 11/2003 |
| EP | 1445703 | 8/2004 |
| EP | 1 455 511 A1 | 9/2004 |
| EP | 1528827 | 5/2005 |
| EP | 1 542 482 A2 | 6/2005 |
| EP | 1 587 332 A1 | 10/2005 |
| EP | 1 613 102 A1 | 1/2006 |
| EP | 1 615 455 A1 | 1/2006 |
| EP | 1 633 100 A1 | 3/2006 |
| EP | 1772822 | 4/2007 |
| GB | 2 352 856 A | 2/2001 |
| GB | 2 356 777 A | 5/2001 |
| GB | 2372867 | 9/2002 |
| GB | 2 383 149 A | 6/2003 |
| GB | 2 406 996 A | 4/2005 |
| GB | 2 407 002 A | 4/2005 |
| GB | 2 414 621 A | 11/2005 |
| JP | 2002/140272 | 5/2002 |
| WO | WO 96/24213 | 8/1996 |
| WO | WO 97/33421 | 9/1997 |
| WO | WO 98/37685 | 8/1998 |
| WO | WO 00/44151 A2 | 7/2000 |
| WO | 00/62564 | 10/2000 |
| WO | WO 01/22748 A1 | 3/2001 |
| WO | WO 01/31497 A1 | 5/2001 |
| WO | 01/44977 | 6/2001 |
| WO | 01/63423 | 8/2001 |
| WO | WO 01/55892 A1 | 8/2001 |

(56) References Cited

FOREIGN PATENT DOCUMENTS

| | | |
|---|---|---|
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/77840 A1 | 10/2001 |
| WO | WO 01/78425 A1 | 10/2001 |
| WO | WO 01/91400 A2 | 11/2001 |
| WO | WO 01/93551 A2 | 12/2001 |
| WO | WO 01/97539 A2 | 12/2001 |
| WO | 02/23423 | 3/2002 |
| WO | WO 02/31624 A2 | 4/2002 |
| WO | 02/44989 | 6/2002 |
| WO | WO 02/44834 A2 | 6/2002 |
| WO | WO 02/054803 A1 | 7/2002 |
| WO | WO 02/059720 A2 | 8/2002 |
| WO | WO 02/069585 A2 | 9/2002 |
| WO | WO 02/075574 A1 | 9/2002 |
| WO | WO 02/080595 A2 | 10/2002 |
| WO | WO 02/084895 A1 | 10/2002 |
| WO | 02/096056 | 11/2002 |
| WO | WO 03/015430 A1 | 2/2003 |
| WO | WO 03/019845 A2 | 3/2003 |
| WO | WO 03/024136 A1 | 3/2003 |
| WO | WO 03/038638 A1 | 5/2003 |
| WO | WO 03/088690 A1 | 10/2003 |
| WO | WO 2004/034671 A1 | 4/2004 |
| WO | WO 2004/054205 A1 | 6/2004 |
| WO | WO 2004/084532 A1 | 9/2004 |
| WO | WO 2004/086791 A1 | 10/2004 |
| WO | 2004/100470 | 11/2004 |
| WO | WO 2004/100470 A1 | 11/2004 |
| WO | WO 2004/100521 A1 | 11/2004 |
| WO | 2004/107795 | 12/2004 |
| WO | WO 2004/114109 A1 | 12/2004 |
| WO | WO 2005/015806 A2 | 2/2005 |
| WO | WO 2005/029769 A1 | 3/2005 |
| WO | WO 2005/062637 A1 | 7/2005 |
| WO | 2005/073863 | 8/2005 |
| WO | WO 2005/076650 A1 | 8/2005 |
| WO | 2005/083980 | 9/2005 |
| WO | 2005/086927 | 9/2005 |
| WO | WO 2006/002869 A1 | 1/2006 |
| WO | WO 2006/005001 A2 | 1/2006 |
| WO | 2006/024003 | 3/2006 |
| WO | WO 2006/026505 A2 | 3/2006 |
| WO | WO 2006/027407 A1 | 3/2006 |
| WO | WO 2006/093284 A1 | 9/2006 |
| WO | WO 2006/105202 A2 | 10/2006 |
| WO | WO 2006/110446 A1 | 10/2006 |
| WO | WO 2006/119481 A2 | 11/2006 |
| WO | 2007/002025 | 1/2007 |
| WO | 2007/060451 | 5/2007 |
| WO | WO 2007/056698 A2 | 5/2007 |
| WO | 2007/091089 | 8/2007 |
| WO | WO 2008/013437 A1 | 1/2008 |
| WO | WO 2008/053062 A2 | 5/2008 |

OTHER PUBLICATIONS

"Communication Pursuant to Article 94(3) EPC", European Application No. 08 101 640.4 (4 pages), Nov. 25, 2009.

"European Search Report", European Patent Application No. EP 08 10 1640, Mar. 19, 2008.

"European Search Report", European Application No. EP 08 10 1331, Jun. 4, 2008.

"European Search Report date Jun. 26, 2008", European Patent Application No. 08155590.6.

"International Preliminary Report on Patentability and Written Opinion", International Application PCT/EP2008/005084, Nov. 17, 2009.

"International Search Report (Form PCT/ISA/210) and Written Opinion", International Application No. PCT/EP2008/058117, Feb. 13, 2009.

"International Search Report dated May 6, 2008", International Application No. PCT/EP2008/050208.

"Office Action", related U.S. Appl. No. 12/221,028, Feb. 19, 2009.

"U.K. Search Report under Section 17", U.K. Patent App. No. GB0809536.6, Jun. 9, 2008.

"U.K. Search Report Under Section 17", U.K Application No. GB 0712291.4, Aug. 16, 2007.

"United Kingdom Search Report dated Apr. 13, 2007", UK Application No. GB0700340.3.

"United Kingdom Search Report under Section 17", Application No. GB0709426.1, Sep. 10, 2007.

"Written Opinion of the International Search Authority May 6, 2008", International Application No. PCT/EP2008/050208.

"On the Design and Evaluation of Job Scheduling Algorithms," Jochen Krallman, Uwe Schwiegelshohn and Ramin Yahyapour, Lecture Notes in Computer Science, vol. 1659, Jan. 1, 1999, pp. 17-42.

U.K. Search Report under Section 17 dated Oct. 11, 2007 of corresponding U. K. Patent Application No. GB0711527.2.

U.K. Search Report under Section 17 dated Jun. 27, 2008 of corresponding U. K. Patent Application No. GB0808041.8.

International Search Report and Written Opinion of the International Searching Authority) dated Nov. 3, 2008, issued in counterpart International Application PCT/EP2008/057303.

Notification Concerning Transmittal of International Preliminary Report on Patentability (Chapter 1 of the Patent Cooperation Treaty) mailed Dec. 30, 2009 in related International Application PCT/EP2008/057503 (1 page).

International Preliminary Report on Patentability mailed Dec. 30, 2009 in related International Application PCT/EP2008/057503 (1 page).

Written Opinion of the International Searching Authority mailed Dec. 30, 2009 in related International Application PCT/EP2008/057503 (6 patges).

Communication pursuant to Article 94(3) EPC issued Jan. 14, 2011 by the European Patent Office in related European Application No. 08 761 022.6 (6 pages).

"International Preliminary Report on Patentability and Written Opinion", International Application PCT/EP2008/057438, (6 pages), Dec. 17, 2009.

"PCT International Search Report and Written Opinion", PCT International Application No. PCT/EP2008/057438 (9 pages), Jan. 22, 2009.

"U.K. Search Report under Section 17", U.K. Application No. GB0803468.8, (1 page), Jun. 4, 2008.

\* cited by examiner

METHOD AND A SYSTEM FOR DELIVERING MESSAGES

CROSS-REFERENCE TO RELATED APPLICATIONS

This is a continuation of U.S. patent application Ser. No. 12/157,518 filed Jun. 11, 2008, which claims priority from UK Application GB 0711527.2 filed Jun. 14, 2007 and from U.S. Provisional Patent Application No. 60/934,525 filed Jun. 14, 2007, the entire contents of each of which is incorporated herein by reference.

FIELD OF THE INVENTION

The invention relates to communications systems, and particularly to a method and a system for delivering messages via communications systems.

BACKGROUND OF THE INVENTION

Mobile marketing is considered by advertisers as the next new channel to reach direct to the user by utilizing the core assets and characteristics of the mobile media: it being personal, "always on", mobile and naturally forming groups of people who communicate actively with each other. These characteristics combined with social networks—based marketing approach of the Internet could form a very powerful base to execute marketing strategies.

In general, mobile marketing and advertising can be divided into the following four categories:
  a) Mobile Marketing: The systematic planning, implementing and control of a mix of business activities intended to bring together buyers and sellers for the mutually advantageous exchange or transfer of products where the primary point of contact with the recipient is via their mobile device.
  b) Mobile Advertising: The paid, public, non-personal announcement of a persuasive message by an identified sponsor; the non-personal presentation or promotion by a firm of its products to its existing and potential customers where such communication is delivered to a mobile phone or other mobile device. Examples of mobile advertising would include: Wireless Application Protocol (WAP) Banner ads, Web page Banner ads, mobile search advertising, mobile video bumpers, and interstitial ads in on device portals.
  c) Mobile Direct Marketing: Sales and promotion technique in which the promotional materials are delivered individually to potential customers via the potential customer's mobile phone or other mobile device. Examples of mobile direct marketing include the sending of Short Message Service (SMS), Multimedia Message Service (MMS) or WAP push messages, Bluetooth messaging, personalized WAP and Web page banner and other advertisements and other interrupt based marketing to mobile phones or other mobile devices.
  d) Mobile customer relation management (CRM): Combination of all the above in a manner that establishes a long-term, engaging relationship between the customer and the promoting company.

Today's mobile marketing is usually mostly based on push campaigns to opt-in recipient mobile number database, or pull campaigns that acquire mobile phone numbers from recipients. A popular method is direct advertisement done using text and picture messaging. As the mobile device is conceived very personal, it cannot be filled with junk advertisement, as people stop receiving advertisements, either by unsubscribing from the advertisement service or by blocking the advertisements with some technical mechanism. Thus, the receivers have either to opt-in to certain campaigns, or provide enough personal details for targeting the advertisements more precisely than in the traditional media. Using personal details makes the advertisements more compelling and more effective to the advertisement receiver, and may thus enable a higher number of advertisements to be sent to a single receiver without causing the receiver to consider the marketing information received via a mobile channel as a burden. Also the utilization of the capacity of the network is improved. On the other hand, the more individually the delivery of the marketing messages is targeted in the network, the more processing capacity is needed for selecting targets and scheduling the delivery and/or reserving network resources. The advertisement reservation and allocation may involve dozens or hundreds of parameters that can be freely selected on an advertisement basis, which may easily lead to a reservation method that cannot effectively reserve the advertisement receivers and achieve a full booking in the utilization of mobile network resources point of view. The reservation is also time-constrained challenge, as there is only a short period of time (e.g. few hours) available in a day to run the reservation, which imposes further requirements for the processing/computing capacity. The number of advertisement receivers (i.e. recipients) may be extremely high (e.g. hundreds of thousands or millions of recipients). If a reservation method using a limited processing capacity is optimized to provide a high accuracy and guarantee a maximum number of messages sent in a network per day, the processing is easily be too slow for such a high number of advertisement receivers and the time available for processing. On the other hand, if a reservation method using a limited processing capacity is optimized for the speed of processing, a high number of advertisement receivers can be processed with the time available for processing, but the accuracy is reduced, i.e. the customers may receive wrong type of or too many messages and/or the network resources may not be used efficiently in terms of a number of messages sent in a network per day.

SUMMARY OF THE INVENTION

In accordance with at least one embodiment of the invention, methods, systems and software are provided for supporting or implementing functionality to provide an output, as specified in the independent claims. This is achieved by a combination of features recited in each independent claim. Accordingly, dependent claims prescribe further detailed implementations of the present invention.

According to an aspect of the invention, there is provided a scheduling method for generating a schedule for use in triggering transmission of message content in a telecommunications network according to an available inventory of messaging events, the method comprising:
  i) maintaining group data identifying a plurality of message groups, each of said groups being associated with one or more predefined criteria;
  ii) maintaining profile information relating to potential message recipients;
  iii) using a first allocation algorithm to define a first allocation of messages relating to one or more of the groups based on said one or more predefined criteria and the profile information;
  iv) using a second allocation algorithm, different to the first allocation algorithm, to define a second allocation of messages relating to the one or more of the groups based on said one or more predefined criteria and the profile information;

v) selecting, on the basis of one or more selection criteria, one of said first allocation and said second allocation; and vi) inserting scheduling data into said schedule on the basis of the selected allocation, wherein the selected allocation defines message recipients and respective message content to be sent to the defined recipients.

Accordingly, in embodiments of the present invention, multiple algorithms are used to define inventory resource allocations, allowing a preferred allocation to be selected and a schedule thereby generated. This enables resources to be allocated more efficiently than in systems using only a single allocation algorithm. In some embodiments, the criteria used for this selection may be varied according to a scheduling condition, for example, an amount of inventory resource available and/or an amount of message content to be scheduled; this allows a flexible system able to adapt to varying conditions and thereby able to allocate resources efficiently.

In some embodiments, steps iii) to vi) are performed with respect to each of a first plurality of message groups and a second plurality of message groups, with different algorithms being used for the second plurality of message groups to the algorithms used with respect to the first plurality of message groups. This allows algorithms to be varied according to a message group, improving the flexibility and efficiency of the method.

BRIEF DESCRIPTION OF THE DRAWINGS

In the following the invention will be described in greater detail by means of exemplary embodiments with reference to the attached drawings, in which.

Figure 1:
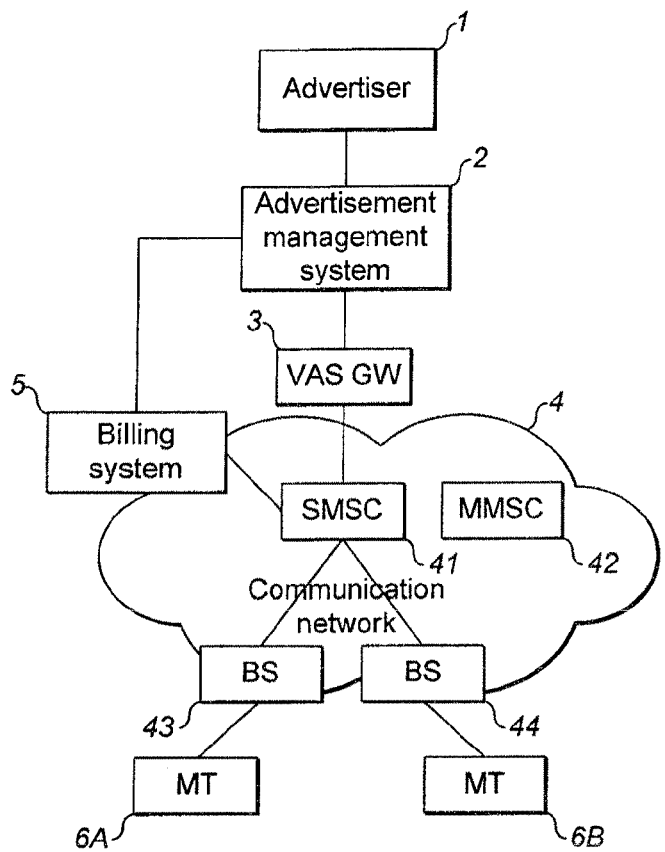
FIG. 1 is a block diagram illustrating a high-level architecture of an exemplary telecommunications system wherein the concepts of the present invention may be implemented.

In the drawings, the same references symbols refer to similar structures or functions.

DETAILED DESCRIPTION OF THE INVENTION

According to an exemplary concept of the invention a mobile communications service provider to provide free or subsidized mobile communications services to users or recipients in return for receiving messages from a sending party, typically as part of a messaging campaign of the sending party. The sending party could be a company wishing to bring their goods and/or services to the attention of the recipient, to inform them of the URL of their homepage, to request feedback on or assess interest in goods and services using, for example, multiple choice questions, or to provide general information. Messages sent as part of a messaging campaign are herein referred to as "campaign messages". The messaging campaigns can be viewed as each defining a group of messages; each of the groups may be associated with predefined criteria, as described below.

The mobile communications service provider or operator is referred to as a Commercial Virtual Operator (CVO) and the service concept is referred to as a Commercial Virtual Operator Network (CVON). The CVO is a virtual operator in a sense that while the users experience the CVO as a normal network operator, the CVO may not necessarily have any mobile communications network of its own but it may lease or hire part or all of the required mobile network resources from a mobile communications network of another network operator for business purposes of building a virtual operator which offers free or subsidized mobile communications services. In order to obtain free or subsidized communications services the recipient may be required to receive a predetermined number of campaign messages per a time period, respond to certain messages, etc. For example, a recipient may be expected to receive 4 short messages (SMS) or multimedia messages (MMS) per day 7 days per week. An example of mobile communications services offered in return to recipient may be 100 minutes of voice service and 200 text messages and some data services. Technically the mobile communication services may be provided and the campaign messages delivered via network operator's network to recipients. The free or subsidized mobile communications services offered as a reward to the users or recipients may be provided before, during and/or after said target users receive and/or react to the campaign messages. The reward may be provided to the user in a single action or in a plurality of actions. Rewards given before receiving/reacting to campaign messages may be different from rewards given after receiving/reacting to campaign messages. A first reward may be a reward for joining/completing a subscription agreement. A reward given during receiving/reacting to campaign messages may a free or subsidized communication or service relating to an advertisement, for example. The CVON may cancel (bill/charge afterwards) free or subsidized mobile communications services given beforehand if a user fails to meet the terms and conditions, e.g. receive or react to a predetermined number of campaign messages. Embodiments of the invention may be also used by non-virtual operators when they offer fully or partly subsidized services for their subscribers.

Sending parties may make agreements directly or via an agent with the CVO on delivery of campaign messages to target recipients.

Sending parties may pay for the services of message delivery to the CVO. Payment fees may include delivery cost of the actual message, profiling cost of the messages, monthly payments, profit margin of the CVO, etc. There may be a set of different types of messages offered by the CVON to third parties. These may include but are not limited to multimedia message service (MMS) based messages, short message service (SMS) based messages, message tagging, wireless application protocol (WAP) push based messages, banner advertisements, search related messages, and interactive messages. The above list describes only at a high level the functionality of exemplary messaging possibilities that may be offered with the CVON concept to third parties. There may also be, for example, video, audio, etc. type of messages provided by the CVON. Typically more than one message type is offered to third parties in order to offer a comprehensive enough portfolio of tools for the sending party to create innovative messaging campaigns.

Figure 4:
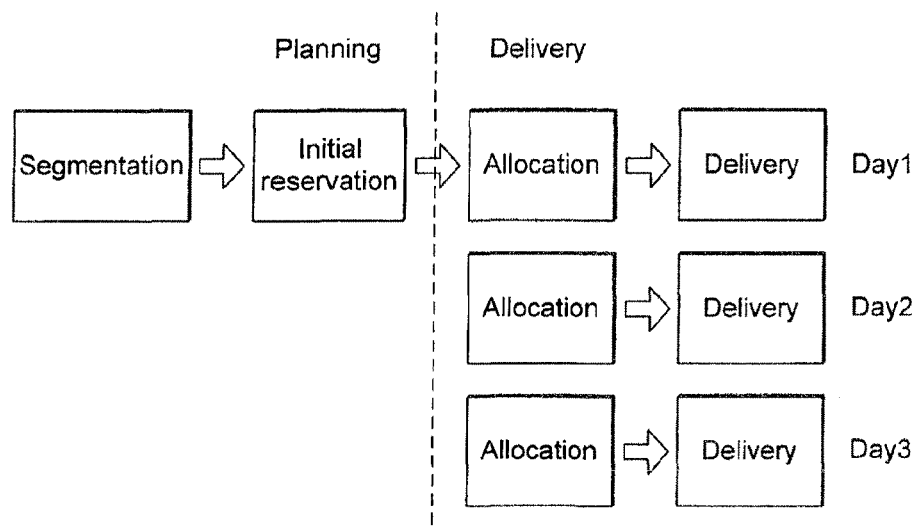
FIG. 4 is a flow diagram illustrating an example of planning and delivery of campaigns for several days.

FIG. 1 is a block diagram illustrating a high-level architecture of an exemplary telecommunications system wherein the concept according to FIG. 4 may be implemented. Reference numeral 6 denotes a mobile terminal. The mobile terminal 6 may be a mobile phone, a personal digital assistant (PDA), a multimedia computer, a personal computer, a lap top, etc., or generally any terminal capable of access in services, such as content download, web browsing, streaming, Wireless Application Protocol (WAP) browsing, voice and messaging.

The telecommunications system of FIG. 1 comprises one sending party 1 but there are typically many such sending parties. The sending party 1 may reserve, program, and/or book a campaign via a web interface of a message management system 2, for example. The sending party 1 may provide message content in the form of, for example, data, text, pictures, audio, video, links, Hypertext Markup Language (HTML), Extensible Markup Language XML, and/or Extensible Hypertext Markup Language (XHTML) to the message management system 2. The sending party 1 may also provide parameters for the messaging campaign or advertisement, such as: when to send messages, to which target group, on which format, a target price level of the advertisement, a target feedback level of the advertisement, demographics of the target audience, a duration of the advertisement campaign.

The message management system 2 manages messaging campaigns and may comprise a message database that may contain all relevant information for the messaging campaign to be run. The message management system 2 may also have tools for the sending party 1 to define a campaign so that all or some of the campaign parameters and the rules may be set, cancelled, modified, updated, or otherwise processed by the sending party 1. The message management system 2 may be used to keep and maintain rules of the sponsoring of access to web services for the users.

It should be appreciated that, as used herein, a message delivery refers to any type of triggering of a message being sent based on the results of the optimized reservation according to the invention. For example, the delivery may be direct sending of the message, programming or configuring any network element to perform the message sending, providing commands to a message delivery system of another operator to perform the message sending, etc.

In the illustrating example shown in FIG. 1, the message is delivered to users 6A and/or 6B via communication network 4. The communication network 4 can be any cellular, broadcast, wide area, local area network or the Internet. Examples of cellular network technologies include but are not limited to GSM (Global System for Mobile communication), WCDMA (Wideband CDMA), CDMA (Code Division Multiple Access), GPRS (General Packet Radio Service), UTRAN (UMTS Radio Access Network), UMTS (Universal Mobile Telecommunications System), MUMS (Multicast Broadcast Multimedia System). Examples of other network technologies include but are not limited to local area networks, such as Wireless Local area networks (WLAN), BlueTooth (BT), and other technologies, such as WiMax (Worldwide Interoperability for Microwave Access), Broadcasting over cellular, Broadcasting over DVB-H (Digital Video Broadcasting-Handhelds), ISDB-T (Terrestrial Integrated Services Digital Broadcasting), DMB (Digital Multimedia Broadcasting). The communication network 4 may also be provided by any generic Internet access using any transport methods. The communication network 4 can be also a combination of different communication network technologies.

In the example of FIG. 1, the communication network 4 comprises a cellular network and is shown with exemplary network elements, such as base stations (BSs) 43 and 44, a Short Message Service Center (SMSC) 41 and a Multimedia Message Service Center (MMSC) 42.

There may also be provided a value added service gateway (VAS GW) 3 that connects the communication network 4 or some of the elements thereof to the message management system 2. The VAS gateway 3 may also be connected to a billing system 5. The VAS gateway 3 may include a message delivery component for sending campaign messages to the customers through the communications network 4. The VAS gateway 3 may also include a database and an action-tracking component for monitoring user actions regarding the messages.

A billing system 5 represents any real-time billing system or close-to-real-time billing system that may be employed for monitoring the usage of the communication services in the communications network 4. Services, i.e. communication events, may include but are not limited to voice and/or messaging services (Short Message Service, Multimedia Message Service, Instant Message Service, Electronic mail services), video telephony services, push to talk services, data services such as Internet or Wireless Application Protocol (WAP) browsing services, content usage (television, radio, video) services, download services, software (including games, applications, tools and utilities), Flash or Quicktime animations/shows, SIM toolkit messages. The billing system 5 may also refer to any $3^{rd}$ party offered service running in a server or a computer system, such as a proxy server or a web server that offers services to mobile users. The billing system 5 may receive charging records from other network elements, each charging record comprising all or some of the information required for the billing of a given communication by a user in the communications network, possibly excluding price information. A charging record may specify the content and format of the file that is delivered to the billing system 5. Charging records are often referred to as call detail records (CDRs) or charging data records, or service detail records (SDRs) in value added services. The charging records may include not only the user's calling or originating number/address or similar identity but also a destination of the communication, for example, a called telephone number of a communication, an Uniform Resource Locator (URL) or similar network address accessed via the communication network 4, a telephone number or network address number to which a message is sent, etc. The information can be delivered to the billing system 5 from any communication network element handling a given communication, such as via a short message service center (SMSC) handling SMS messages of a user, a multimedia message service center (MMSC) handling MMS messages of a user, Wireless application protocol gateway (WAP-GW) handling a WAP communications of a user, and an Internet access point (Internet AP), a serving GPRS support node (SGSN), a gateway GPRS support node (GGSN), etc.

In an embodiment of the invention, the billing system 5 may be used to meter usage of the services. The metered usage of the services may be compared with a free/subsidized balance allocated to each recipient in the communication network. In embodiments of the invention, typically no invoices are sent to recipients but the metered usage may be compared with the business rules associated with customer and metered cost may be invoiced directly or indirectly from advertisers, such the advertiser 1.

The type and format of a campaign message as well as the delivery method used may be selected among those available in the communication network 4 employed. Such message formats and delivery methods may include but are not limited to messaging services, such as short message service (SMS), multimedia message service (MMS), Instant Message Service (IMS), electronic mail, file down-loading or browsing services, such as Wireless application protocol (WAP), Word Wide Web (WWW), audio streaming, video streaming or other data services, etc.

Figure 2:
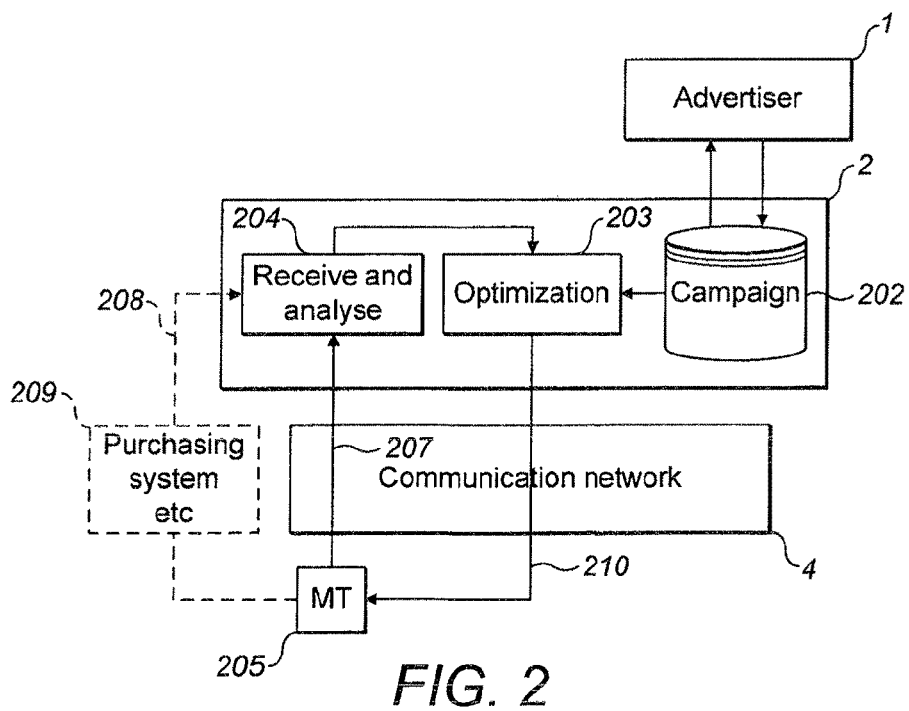
FIG. 2 is a block diagram illustrating an example of an advertisement management system in accordance with an aspect of the invention.

The message management system 2 manages messaging campaigns and its databases may contain all relevant information for the messaging campaign to be run. The messaging system 2 may comprise one or more databases, computer programs and/or related hardware that can be used to offer a tool and an interface, such as a web interface, for the sending parties to access the messaging management system 2 to reserve, program and define an advertisement campaign. An example of the message management system 2 will be described below with reference to FIG. 2.

The sending party 1 may access the message management system 2 via a web interface using personal computers with a web browser, or via any similar interface 201 suitable for the access. The sending party 1 may program a campaign including the preferred profiles, pricing, timing, advertisement content, desired impact levels, feedback requests, etc. to the message management system 2, or to look, modify, add, extract reports, etc. The message management system 2 may include a database or databases 202 for storing the campaigns and related content and other information. The recipients (users) of the mobile services offered by the CVON may be referred as members, subscribers, users, or recipients. The database 202 may also comprise a recipient database containing required information on the members, such as profile information of users or members. Typically the information may be collected prior to allowing the recipient to join free mobile service. The information may be updated later as the preferences of the member change and/or there is need to collect more information on the members. The information may be updated also automatically as the member or peer group of the member interacts with the messaging system directly or indirectly. The sending party 1 may use the profile information as they define a target audience for the messaging campaigns using these profiles. The member information may be presented to sending parties in such a format that no direct association can be made between any specific recipient and his/her profile, i.e. the anonymity of the recipients is conserved.

In the profile information, at least one of the profiles may comprise one or more of the following pieces of information: a sociological background of a user; age; sex; a target telephone type; an income level; status of a user; a location of a user; historical data of a user's behavior; information of sent direct messages to a user; information of content vouchers or coupons sent to a user; codes of vouchers or coupons sent to a user; lifestyle and interest related; behavior; demographics; education; marital status; zip code; preferred times for messages. Moreover, the database 202 may store campaign parameters, such as campaign messages, a user profile; preferences of when to send messages; to which target group an advertisement is sent; on which format a message is sent; a target price level of a message; a target feedback level of the message; a target audience; demographics of a target audience; a duration of a messaging campaign, cost per message; type of message; a sociological background of a target audience; age; sex; a target telephone type; an income level; status of a user; a location of a user; historical data of a user's behavior; historical data on a behavior of a profile of users; information of sent direct messages to a user; information of content vouchers or coupons sent to a user; codes of vouchers or coupons sent to a user; a time of a day or a week or a month or a date, alpha and omega scores, other calculated values from user behavior or user mass analysis, etc. The message management system 2 may also be used to maintain rules of the sponsoring communications and/or service access.

The message management system 2 may also contain an optimization unit 203 that may perform the campaign delivery optimization, analyze the effect of the optimization, store learning data of the campaign optimization and define the actual delivery rules for delivery (210) of the messages to the recipients. In addition, there may be a receive and feedback unit 204 in the message management system 2. The receive and feedback unit 204 may collect direct and/or indirect feedback and responses to the messages and feed the related information to the optimization unit 203 and/or to the database 202 and/or to the sending party 1. The direct feedback refers to a recipient (MT) 205 responding (207) to a direct question, a query etc. The indirect feedback (208) refers to, for example, the purchase of goods or the usage of a coupon, and the indirect feedback may be obtained, for example, from a purchasing system 209.

The message management system 2 uses message requests received from the sending party 1 to fill an inventory for sending message content. The inventory may comprise an amount of network resource allocated for sending messages during a predetermined time period (a "time window"). The inventory may comprise a plurality of slots for sending messages of a fixed or variable size. The message management system 2 uses allocation algorithms to allocate resources of the inventory for delivering messages in accordance with embodiments of the present invention.

The allocation process will now be explained by way of example, and in the context of allocating message recipients. In a message management system 2 there may be dozens or hundreds of criteria which may be used to define a campaign. In order to explain the invention we use as an example a case with 3 criteria (on/off criteria) A, B, and C, a total of 5 recipients 1, 2, 3, 4, 5, and a plurality of different campaigns $c_1, c_2, c_3, \ldots, c_N$. For example, a criterion could have a value of ON if a recipient is aged above 22, and OFF otherwise. An exemplary user profile database is assumed be as shown in Table 1.

TABLE 1

| A profile database | | |
|---|---|---|
| N  | N  | N  |
| N  | FF | FF |
| N  | N  | FF |
| FF | N  | N  |
| N  | FF | FF |

Example 1

In a first example of selection algorithm there are campaigns $C_1$, $C_2$, and $C_3$. Where In campaign $C_1$ it is defined that 2 messages are to be sent to recipients having a profile A.

In campaign $C_2$ it is defined that 2 messages are to be sent to recipients having a profile B.

In campaign $C_3$ it is defined that 2 messages are to be sent to recipients having a profile C Allocation algorithm 1 is assumed to use a recipient number based allocation and order of campaigns as 1, 2, and 3. Only one message per recipient is allowed. Allocation algorithm 1 gives rise to the following delivery of the campaigns $C_1, C_2, C_3$. Messages of the campaign C1 are allocated to be sent to the recipients 1 and 2. Messages of the campaign C2 are allocated to be sent to the recipients 3 and 4. No messages of the campaign C3 are allocated to be sent to the recipients, since there are no recipient with a profile C left: a message has already been allocated to be sent to recipient 1 and 3 in campaigns C1 and C2, and only one message per recipient is allowed. The only recipient 5 who has not yet received any messages does not have profile C.

Allocation algorithm 2 uses a different sending order, the order of campaigns being 3, 2, and 1, for example. Only one message per recipient is allowed. This results in a different allocation of inventory resources of the recipient to the campaigns. More specifically, one message of the campaign C3 is allocated to be sent to each of the recipient 1 and 4, one message of the campaign C2 is allocated to be sent to the recipient 3 and one message of the campaign C1 is allocated to be sent to each of the recipients 2 and 5. Thus, the allocation algorithm 2 results in sending a message to each one of the recipients 1 to 5, and all campaigns are carried out, even though one campaign only partially. Therefore, the allocation algorithm 2 leads to a better utilization of resources (a total of 5 messages) than the previous algorithm 1 (a total of 4 messages), which demonstrates that the selection of an allocation algorithm has an impact on the results.

Allocation algorithm 3 is similar to the allocation algorithm 1 but allows up to 3 messages per recipient. Again, this results in a different allocation of inventory resources. More specifically, the messages of the campaign C1 are allocated to be sent to recipients 1 and 2. The messages of the campaign C2 are allocated to be sent to the recipients 1 and 3. The messages of the campaign C3 are allocated to be sent to recipients 1 and 4. Thus, the allocation algorithm 3 results in the best utilization result (6 messages) but also in a greater load of messages to the recipient 1 and no messages to the recipient 5.

Allocation algorithm 4 selects the recipient having the least number of messages sent per period of time but not having restrictions relating to a maximum number of messages per recipient. Optimization rounds would result in the following reservation of the recipients to the campaigns. The messages of the campaign C1 are allocated to be sent to the recipients 2 and 5. The messages of the campaign C2 are allocated to be sent to the recipients 1 and 3. The messages of the campaign C3 are allocated to be sent to the recipients 1 and 4. Thus, the allocation algorithm 4 leads to a full utilization and an even distribution.

In some embodiments, the algorithms are based on fuzzy logic techniques; instead of the criteria having discrete values (for example an age of 22 in the above example), a set of discrete values (e.g 21, 22, 23) could be set and probabilities assigned to selecting recipients in dependence on their ages.

As a summary, the exemplary algorithms presented above show that different algorithms for allocating resources with respect to the same recipients and campaigns give different results. One algorithm may have an advantage of being simple and fast to be executed with a computer program, for example, while another algorithm may lead to inventory resources being allocated for all messages of all campaigns to be sent, and some other algorithms could be targeted to provide an even distribution of the messages among users. However, the challenge is that, typically in practice, no single algorithm can meet all requirements, for example there may be conflicting issues between a full utilization of resources (as high a total number of sent messages as possible) and recipient satisfaction (reasonable number of received messages, high relevance of the messages), profit optimization versus serving all sending parties etc.

Figure 3:
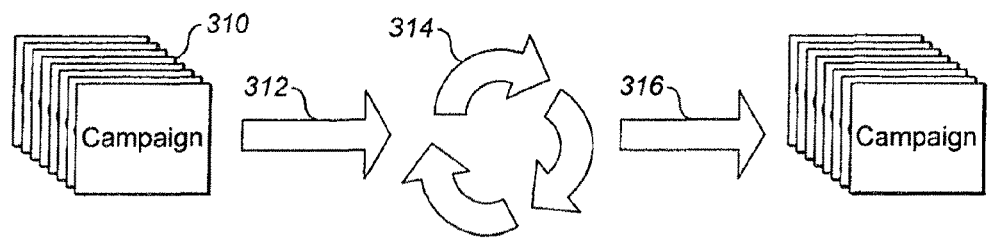
FIG. 3 is a flow diagram illustrating an example of a reservation process that uses a single reservation algorithm.

FIG. 3 illustrates a prior art allocation process using a single allocation algorithm. Campaigns 310 are fed 312 in the message management system 2, the allocation algorithm 314 is used and the campaigns are delivered 316 to the allocated users. The problem has further dimensions, such as the time aspect illustrated in FIG. 4. The allocations can be typically performed up to several days or weeks (the planning phase in FIG. 3) before the actual delivery, which may be performed over several days. After the initial allocation there might be new campaigns defined by the same or another sending party, some of the campaigns might be cancelled etc., meaning that the original allocation may not be accurate at all (e.g. due to cancelled or added campaigns) at the time of actual delivery. As already discussed above, this and other factors lead to an ineffective utilization and/or to a slow allocation process. Thus, it is important to have an efficient reservation process at the time of the delivery.

In some embodiments of the present invention, a plurality (two or more) allocation algorithms are used with respect to the same campaign or cluster of campaigns, in parallel or in sequence, in order to maximize the usage of the inventory (i.e. the number of advertisement receivers (i.e. users) multiplied by the message slots per given day) in the restricted amount of a inventory resources available during a given day. In some cases, the message management system 2 may also learn from its own behavior and effectiveness, and it may apply this learned knowledge to subsequent allocation processes to maximize the amount of users covered and to minimize the time spent in the allocation process. This learning will be described in more detail below.

Clustering and multiple allocation algorithms allow both a more accurate and faster allocation process with the limited processing capacity and the limited processing time available in the message management system 2; clustering will be described in more detail below. The clustering and multiple allocation algorithms allow use of algorithms optimal to each specific cluster to enhance accuracy, while at same the time parallel processing is possible for reducing the processing time and/or making several iterations. Due to the enhanced accuracy, the message management system 2 can more effectively allocate inventory resources and improve utilization of mobile network resources and improve the service to the users, i.e. the efficiency is improved. The allocation is also time-constrained, as there is only a short period of time (e.g. few hours) available in a day to perform the allocation, which imposes further requirements for the processing/computing capacity.

Figure 5:
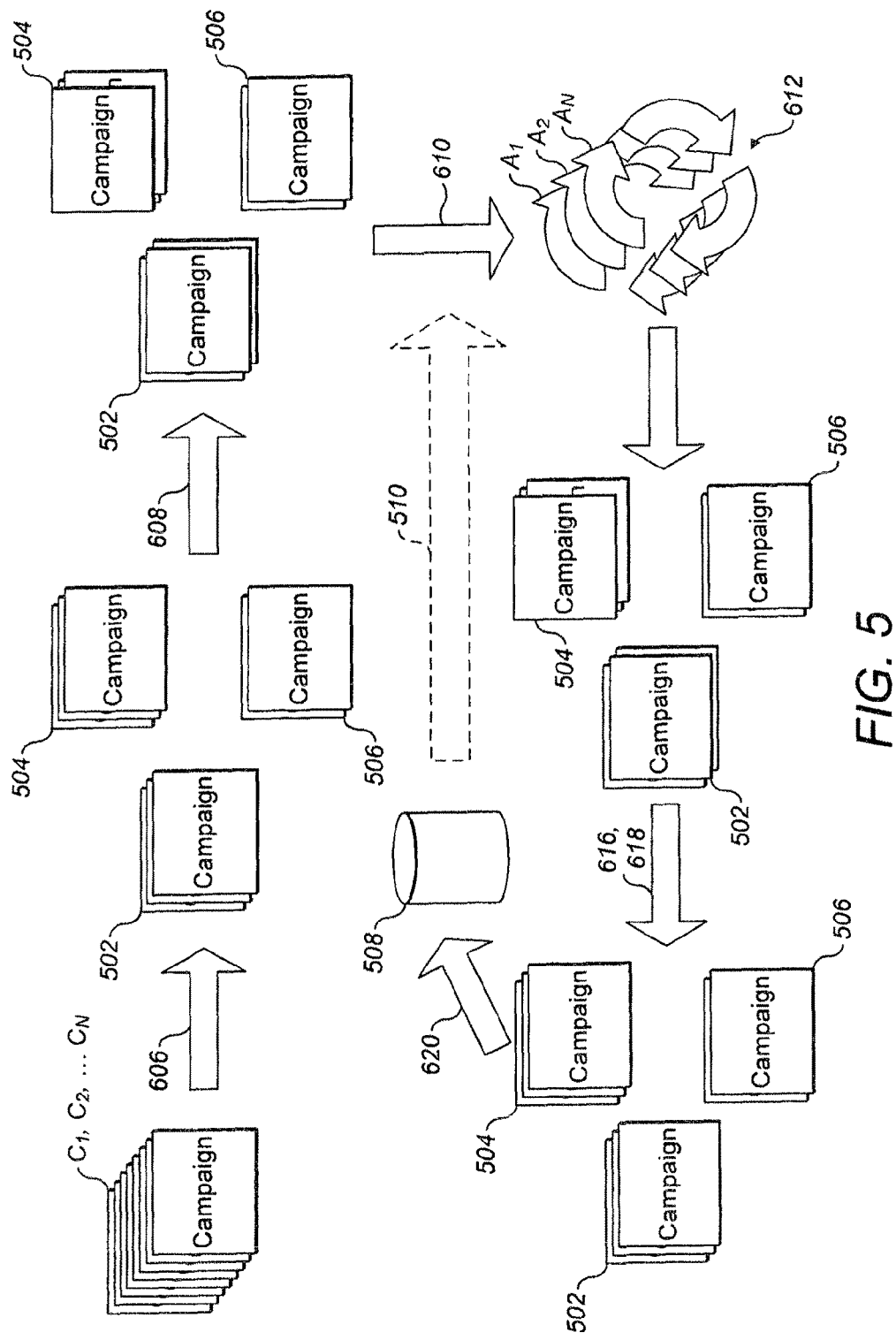
FIGS. 5 and 6 are a flow diagram illustrating an example of a reservation process that uses multiple allocation algorithms in parallel.
Figure 6:
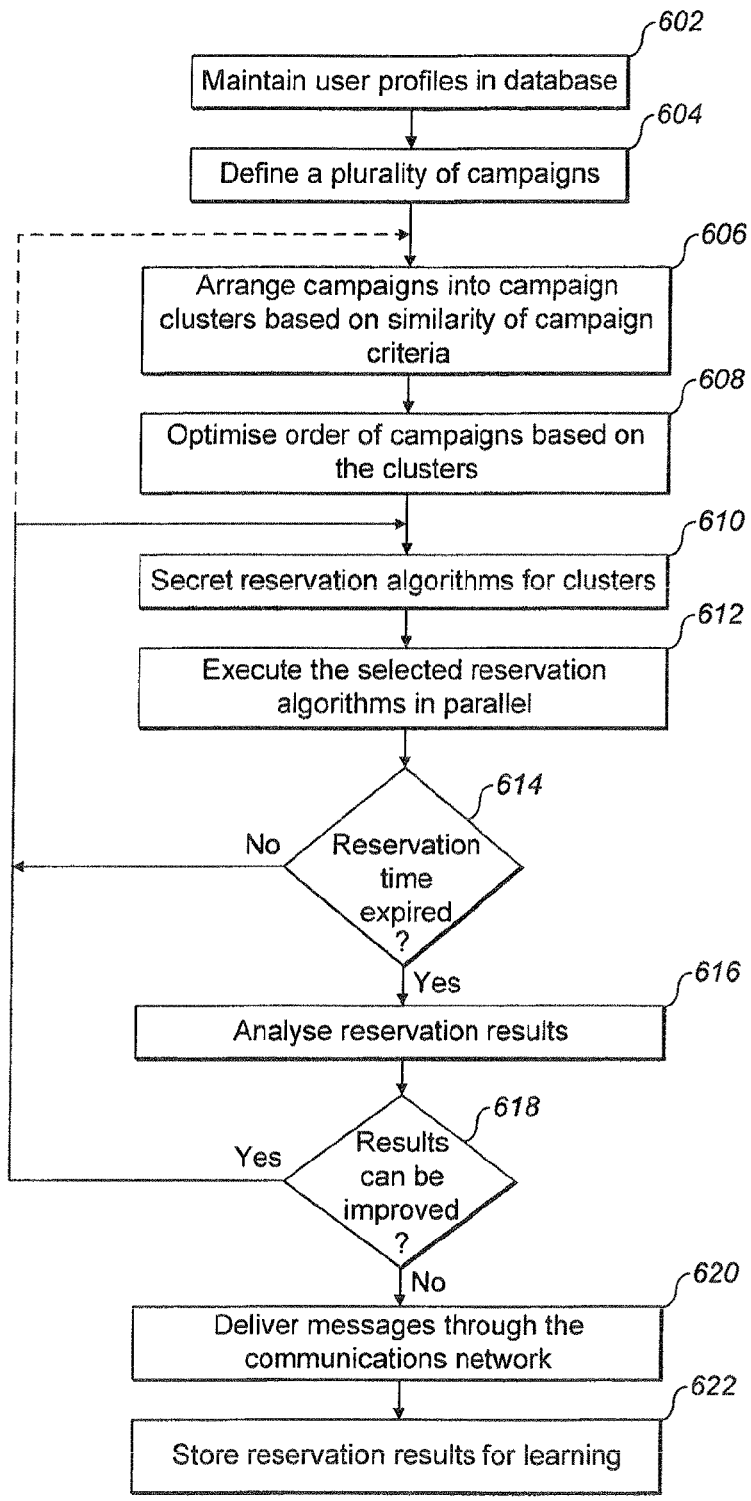

An exemplary process utilizing multiple allocation algorithms in accordance with an embodiment of the invention is described below with reference to FIGS. 5 and 6. The message management system 2 contains user information, such as the user profiles in a database (step 602), as described in the exemplary embodiments above. A plurality of message delivery campaigns $C_1, C_2, \ldots, C_N$ are created or defined with a plurality of parameters in the message management system 2 (step 604), for instance in a similar manner as described above. The sending parties 1 may access the message management system 2 via a web interface using personal computers with a web browser, or via any similar interface 201 suitable for the access to reserve, program and define messaging campaigns. The parameters may include, for example, the preferred user profiles, pricing, timing, advertisement content, desired impact levels, feedback requests, etc. Further examples of suitable parameters, such as the parameters as used in the user profiles, have been given above in the description of the advertisement management system 2, without restricting the invention to these examples. The parameters form the basis for campaign criteria for each of the campaigns $C_1, C_2, \ldots, C_N$. The campaign criteria are used in determining recipients for messages of the campaign and relate to profile information of target recipients, such as an age range, a location, a specified interest or preference, gender, and so on. Each campaign is individually defined to be carried out during one or more message delivery time windows or slots, e.g. during one or more days. The campaigns may be stored in the database 202.

At the time of the delivery, the message management system 2, e.g. the optimisation unit 203, may study the campaigns to be carried out in the present message delivery time window, e.g. today or during following 24 hours, and create campaign lists based on the criteria used in the campaigns. The campaigns may be clustered into a plurality of campaign clusters 502, 504 and 506 according to at least one similarity or commonality between the campaign criteria (step 606), such as one or more of a priority of an advertiser, a number of target users, strictness of campaign criteria, and requirements set for user equipment. Some of the clusters may also contain only one campaign. The order of campaigns $C_1, C_2, \ldots, C_N$ may be optimized, albeit loosely, based on the clusters 502, 504 and 506 (step 608). It may be defined, for example that campaigns of cluster 506 are first in order, campaigns of cluster 502 are second in order, and campaigns of cluster 504 are third in order. Naturally, the campaigns may be ordered also within each cluster based on the algorithm(s) used for the specific cluster. Examples of clustering, and how it affects the allocation process, are given below.

The allocation process may be executed by selecting allocation algorithms $A_1, A_2, \ldots, A_N$ for the clusters 502, 504 and 506 or for individual campaigns $C_1, C_2, \ldots, C_N$ (step 610). The suitable allocation algorithms may be selected among a plurality of allocation algorithms available in the message management system 2. Such algorithms may include the algorithms 1 to 4 described above, for example, but any type of algorithm may be used depending on the desired results. As the campaigns in each specific cluster 502, 504 and 506 have similar criteria, at least regarding the criteria used for the clustering, same algorithm or algorithms can be used for all campaigns within a cluster. However, the algorithm or algorithms may typically differ from one cluster to another. A campaign that cannot be clustered with any other campaign (a one-campaign cluster) may also have a different allocation algorithm. The selected algorithms A1 ... A4 are executed for the respective clusters 502, 504 and 506 or individual campaigns at step 612. For example, the allocation algorithms may aim to allocate inventory resources among all users having profiles in the database, target users for each of said plurality of campaigns based on the campaign criteria and the user profiles, such that as high number of messages as possible with the network resources and the user base available within the given message delivery time window can be delivered without exceeding a predetermined maximum number of message per any given user. Thereby, a first set of allocations for the campaigns are obtained.

Because the allocation is also a time-constrained process, the process may check whether the time available for the allocation process has expired (step 614). If the time has expired, the allocation process may be completed and the process may proceed to step 620. If the time has not expired, the allocation results may be analyzed (step 616), and if it appears that the allocation results may still be improved (step 618), i.e. more messages can be allocated within the delivery schedule and/or reach a broader recipient list etc, as determined by the selection criteria particular to this allocation run, the process may return to step 610 wherein one or more of the selected allocation algorithms may be changed to improve the allocation results. In some cases, the process may return to step 606 wherein the clustering is changed in order to make even more radical changes to the allocation results. One of the allocation results to be monitored may be that all campaigns are adequately allocated. Another allocation result to be monitored may be conflicts between the allocations made by different algorithms. Further, in case of conflicts between the allocation results, also special optimization algorithms, such as peep-hole and rescheduling, may be run, as is described below. The optimization or changes may be made until the reservation results cannot be further improved.

As mentioned above, the allocation results are analyzed at step 616 and a determination as to whether the allocation results can be further improved is made at step 618. Some examples of optimization criteria that can be used for making this determination are now given. One criterion is whether the optimization round could assign more messages for a period of time to which the inventory corresponds. This is especially important when the number/size of message requests received from the sending party 1 is too great for all messages to be sent within the available inventory resource.

Some optimization criteria may relate to a value or values associated with messages and recipients thereof. The operator of the message management system 2 may charge different prices for different messaging campaigns, or messages sent to different users; in some circumstances, it may be desirable to optimize the selection criteria such that the profit for the operator is maximized. Alternatively, or additionally, in some circumstances the sending party may wish to prioritize certain messages/and or message campaigns over others; this could be achieved by assigning different values to the messages/campaigns, and applying an algorithm such that a value for the sending party 1 is optimized.

Further, some optimization criteria may relate to a distribution of messages amongst users i.e. ideally every message recipient should get roughly the same amount of messages and they should also be distributed somewhat evenly in the time or according to delivery preferences specified e.g. in their user profile.

Different optimization criteria may lead to different result sets, and depending on the situation, different allocations are desirable. For example, if there is a big backlog of as yet unsent messages, it may be desirable to weight these messages at the beginning of the allocation process differently to how they are weighted towards the end of the allocation process, to ensure that a relatively greater number of these types of unsent messages are entered into the delivery schedule. Alternatively, or additionally, if the number of message requests is such that there are insufficient inventory resources to allocate to all messages, the messages may be selected based on a message value representing an importance of the message to the sending party 1; this value may be assigned by the sending party 1.

However, results obtained using these criteria may not make full use of the available inventory resources i.e. there may be some available inventory resources that are not assigned to any users. This can be mitigated by using peep-hole optimization, in which the user to which a high-value message, for example, is assigned is changed so that a previously unassigned message can be assigned to the user to which the high-value message was originally assigned. This may be continued until no message candidates for message reassignment can be found, or until messages or users run out.

Returning to FIG. 6, at step 619 the system selects which of the allocations obtained as a result of applying different allocation algorithms is to be used for generating a schedule for sending the messages. This selection is performed based on one or more selection criteria. The selection criteria are typically the same as or similar to the optimization criteria described above.

In step 620, a schedule for sending the message is generated, and the messages are delivered at step 621. The messages of the campaigns C1, C2, . . . , CN to are delivered the reserved target users via the communications network 4 in the determined order during a given message delivery time window, such as a day. Also other delivery rules may naturally be followed in the delivery.

Moreover, at step 622, the created clusters, used algorithms and obtained allocation results, i.e. the allocation strategy used, may be stored in a learning/knowledge database 508 in order for the system to learn optimization strategies. Since there may be a limited time period, and limited processing capacity, available for allocating inventory resources, it is advantageous for the system to be able to learn allocating strategies for efficient allocation of resources within these limitations. The message management system 2 may use the stored allocation strategy for using a similar approach for similar cases, i.e. the system is able to learn 510 from previous allocations. This may further reduce the number of optimization rounds in the allocation process and/or allow time to optimize the allocation results further in subsequent allocations.

Examples of "clustering" according to some embodiments of the present invention are now described. Campaigns are clustered according to which clusters produce the best results according to optimization criteria as described above. Accordingly, the clustering criteria by which campaigns are organized into clusters may vary according to the situation; the criteria may vary according to how optimization criteria are weighted, for example. Furthermore, the system may employ a learning process, as described below; consequentially, the clustering criteria may vary with time.

In some embodiments, clustering is used in conjunction with a partitioning of the database 202 with respect to potential recipients; that is, recipients may be categorized, and one or more of the resulting categories allotted to one or more of the clusters, as is described in the following example.

For the purposes of this example, it is assumed that each recipient included in the database is associated with four criteria A, B, C and D, each of which can have a value of ON or OFF. In this example, each the recipients is categorized into one of 8 categories, a-h, as shown in table 2:

TABLE 2

| Category | A | B | C |
|---|---|---|---|
| A | ON | ON | ON |
| B | ON | ON | OFF |
| C | ON | OFF | ON |
| D | ON | OFF | OFF |
| E | OFF | ON | ON |
| F | OFF | ON | OFF |
| G | OFF | OFF | ON |
| H | OFF | OFF | OFF |

In this example, the recipients are categorized according to values of criteria A, B and C; no categorization is made according to criterion D.

Further, in this example, each campaign has a preference of ON or OFF for each of the criteria A, B, C and D, or no preference may be specified for some criteria. For example, a particular campaign may specify that recipients should have an associated criterion value of ON for criterion A, a criterion value of OFF for criterion B, with no preference for criteria C (and D); potential recipients of this campaign would have associated criterion values of ON for criterion A and OFF for criterion B, the values of criterion C and criterion D being irrelevant for this campaign.

In the present example, the campaigns are clustered according to similarity with respect to criteria A, B and C; this could result in, for example, the six campaign clusters, i-vi, each of which corresponds to a particular set of criteria, as shown in table 3:

TABLE 3

| Cluster | A | B | C |
|---|---|---|---|
| i | OFF | ON | |
| ii | OFF | | ON |
| iii | | ON | ON |
| iv | ON | | |
| v | OFF | OFF | OFF |
| vi | | | ON |

In this example, criterion D is ignored for the purposes of clustering. Although in this example clustering of campaigns is performed with respect to the same criteria with respect to which the database 202 is partitioned, in some embodiments different criteria are used.

For each cluster, categories of recipients can be identified from which potential recipients can be drawn. Table 4 shows which of categories a-f contain recipients which are potential recipients of messages associated with each of the campaign clusters i-vi.

TABLE 4

| Cluster | A | B | C | Potential recipient categories |
|---|---|---|---|---|
| i | OFF | ON | | e, f |
| ii | OFF | | ON | e, g |
| iii | | ON | | a, b, e, f |
| iv | ON | | | a, b, c, d |
| v | OFF | OFF | OFF | h |
| vi | | | ON | a, c, e, g |

Thus in this example, recipients in category h can only receive messages from campaigns in cluster v; recipients in category h are also the only potential recipients of messages of campaigns in cluster v. It is therefore advantageous to assign category h to cluster v only; that is, processing for the campaigns of cluster v is only performed on recipients in category h. Since processing is performed with respect to fewer recipients, this results in a faster processing time and/or requires fewer resources than in systems in which no clustering is performed. Since no potential recipients are excluded, this is done without any change in the number or distribution of messages allocated.

Other similar assignations may also be advantageous. For example, category e could be assigned to cluster i only. This also results in faster processing time and/or lower usage of resources; however, since, for example, category ii now only has potential recipients in category g, it may result in fewer messages being allocated overall. Whether or not this partitioning is effective therefore depends on how speed of processing is weighted as compared to number of messages allocated, etc.

Another aspect with respect to which clustering is advantageous over systems which do not use clustering, is in prioritization of campaigns. Each campaign may specify different levels of strictness with respect to completion within a given "window" i.e. predetermined time period. For example, this could take the form of a further criterion, specifically criterion E, which also can take a value of ON or OFF; campaigns specifying value ON must be completed within the predetermined time period e.g. a day, whereas those with a value of OFF can be completed later than this. If clustering is performed according to this criterion, in addition to criteria A, B and C, a total of 12 clusters may result, as shown in table 5:

TABLE 5

| Cluster | A | B | C | E | Potential recipient categories |
|---|---|---|---|---|---|
| i | ON | ON | | ON | e, f |
| ii | ON | | ON | ON | e, g |
| iii | | ON | | ON | a, b, e, f |
| iv | ON | | | ON | a, b, c, d |
| v | OFF | OFF | OFF | ON | h |
| vi | | | ON | ON | a, c, e, g |
| vii | OFF | ON | | OFF | e, f |
| viii | OFF | | ON | OFF | e, g |
| ix | | ON | | OFF | a, b, e, f |
| x | ON | | | OFF | a, b, c, d |
| xi | OFF | OFF | OFF | OFF | h |
| xii | | | ON | OFF | a, c, e, g |

Processing for clusters having a value of ON for criterion E (clusters i to vi) may be completed before processing for clusters having a value of OFF for criterion E (clusters vii to xii) is started, ensuring that processing for the former clusters is completed within the predetermined time period. A number of consequences arise from this: firstly, processing for vii to xii might not be completed during the allocated time period- so messages for these campaigns might not be sent during the predetermined time period. Secondly, assuming that the algorithms used specify a maximum number of recipients, some recipients will reach this maximum with allocations from clusters i to vi, meaning that there may be a smaller number of potential recipients for vii-xii, which may result in a fewer total number of messages being sent. Thirdly, whether or not the algorithms specify a maximum number of recipients, it is more difficult to spread the messages evenly. Thus, whether clustering in this way is advantageous may depend on how optimization criteria are weighted.

In some embodiments, campaigns within campaign clusters are allocated to different recipients; this may result in an even distribution of messages amongst recipients.

Although in the above examples campaigns are arranged into clusters according to a similarity or commonality between the campaigns, in some embodiments campaigns may be clustered according to different criteria. For example, in some cases clustering may be according to a dissimilarity, or lack of commonality, between campaigns; this may allow processing to be completed with fewer optimization rounds, since there will be less overlap between potential recipients of campaigns clustered in this way. Further, although criteria having a finite number of possible values were used in the above examples, in some embodiments fuzzy logic may be used. In some embodiments the system learns from its own behaviour to improve the criteria used for clustering. An initial set of clustering criteria may be determined by a simulation; this may involve creating a database having similar attributes to the actual recipient database, creating a set of trial campaigns, and running these using a limited combination of criteria. The combination that generates the most favourable results is then selected as an initial combination of criteria.

The learning process may be implemented as follows. The messaging system first quantifies the start situation, for example, whether there an excessive number of message requests, a large backlog of previous requests etc, and evaluates an initial allocation. Next, the system tries a given optimization technique, by for example selecting allocation algorithms and/or optimization algorithms as described above, and stores the results compared to the initial allocation. The results are evaluated with respect to a metric or metrics appropriate to the situation e.g. utilization of inventory resources, delivery of message backlog, revenue, etc. that quantify the improvement. If improvements are satisfactory (for example, if defined thresholds with respect to the optimization criteria are reached), a further optimization round is commenced. If the results are not satisfactory, another optimization technique is tried, the results stored, compared with one another and so forth.

Based on these quantifications, the system learns the effectiveness of optimization techniques for given initial situations and can start to try the optimization techniques in a more efficient order. If it is found that one optimization technique tends to be superior in a given situation, it may always be tried first. If it is found that another optimization technique produces inferior results in a given situation, it may never be used in that situation.

Similarly, the system may try various clustering techniques in a given situation and monitor the results, enabling it to ascertain which clustering techniques are effective in the given situation.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

It will be obvious to a person skilled in the art that the inventive concept can be implemented in various ways. For example, although in the example described above with reference to FIG. 6 the process involved steps of analyzing results and determining whether they can be improved, in some cases there may be no such analysis and determination; instead, two or more algorithms could be applied to the same set of campaigns, and allocations resulting from these used to select, according to the selection criteria, a preferred allocation, with the latter being used as the basis for generating the schedule at step 620. The invention and its embodiments are not limited to the examples described above but modifications and changes can be made without departing from the scope of the attached claims.

The invention claimed is:

1. A computer implemented method comprising:
  determining, by a processor, a first allocation outcome of allocating recipients from a pool of potential recipients to receive messages from a first messaging campaign according to a first allocation algorithm that dictates a first order in which to allocate the recipients to receive the messages from the first messaging campaign, wherein the first messaging campaign:
    is associated with a first campaign goal, and dictates a set of recipient profile parameters for selecting recipients to receive messages from the first messaging campaign;

determining, by the processor, a second allocation outcome of allocating recipients from the pool of potential recipients to receive messages from the first messaging campaign according to a second allocation algorithm that dictates a second order, different than the first order, in which to allocate the recipients to receive the messages from the first messaging campaign, wherein the first allocation outcome and the second allocation outcome are different as a result of the first order and the second order being different;

determining, by the processor, that the first allocation algorithm performed best at achieving the first campaign goal based on an evaluation of the first allocation outcome and the second allocation outcome; and allocating, by the processor, recipients from a second pool of potential recipients to receive messages from a subsequent messaging campaign according to the first allocation algorithm when the subsequent messaging campaign is associated with the first campaign goal.

2. The computer implemented method of claim 1, further comprising:
transmitting the messages from the first messaging campaign based upon the allocation algorithm that performed best at achieving the campaign goal.

3. The computer implemented method of claim 2, further comprising:
receiving feedback regarding the transmitted messages from the recipients to which messages were transmitted.

4. The computer implemented method of claim 1, wherein the campaign goal is to deliver the maximum number of messages from the first messaging campaign.

5. The computer implemented method of claim 1, wherein the campaign goal is to deliver messages from the first messaging campaign to the maximum number of recipients.

6. The computer implemented method of claim 1, wherein the campaign goal is to maximize profit.

7. The computer implemented method of claim 1, further comprising:
storing data indicative of the first allocation outcome and the second allocation outcome.

8. The computer implemented method of claim 1, wherein the first allocation algorithm and the second allocation algorithm dictate a maximum number of messages which can be delivered to each recipient.

9. The computer implemented method of claim 1, wherein each individual recipient from the pool of potential recipients is associated with a recipient profile that specifies the maximum number messages which can be delivered to the respective recipient.

10. A system comprising:
a processor; and
a memory containing instructions that, when executed, cause the processor to:
determine a first allocation outcome of allocating recipients from a pool of potential recipients to receive messages from a first messaging campaign according to a first allocation algorithm that dictates a first order in which to allocate the recipients to receive the messages from the first messaging campaign, wherein the first messaging campaign:
dictates a set of recipient profile parameters for selecting recipients to receive messages from the first messaging campaign;
determine a second allocation outcome of allocating recipients from the pool of potential recipients to receive messages from first messaging campaign according to a second allocation algorithm that dictates a second order, different than the first order, in which to allocate the recipients to receive the messages from the first messaging campaign, wherein the first allocation outcome and the second allocation outcome are different as a result of the first order and the second order being different;
determine that the first allocation algorithm performed best at achieving the first campaign goal based on an evaluation of the first allocation outcome and the second allocation outcome; and
allocate, by the processor, recipients from a second pool of potential recipients to receive messages from a subsequent messaging campaign according to the first allocation algorithm when the subsequent messaging campaign is associated with the first campaign goal.

11. The system of claim 10, wherein the instructions further cause the processor to:
transmit the messages from the first messaging campaign based upon the allocation algorithm that performed best at achieving the campaign goal.

12. The system of claim 11, wherein the instructions further cause the processor to:
receive feedback regarding the transmitted messages from the recipients to which messages were transmitted.

13. The system of claim 10, wherein the campaign goal is to deliver the maximum number of messages from the first messaging campaign.

14. The system of claim 10, wherein the campaign goal is to deliver messages from the first messaging campaign to the maximum number of recipients.

15. The system of claim 10, wherein the campaign goal is to maximize profit.

16. The system of claim 10, wherein the instructions further cause the processor to:
store data indicative of the first allocation outcome and the second allocation outcome.

17. The system of claim 10, wherein the first allocation algorithm and the second allocation algorithm dictate a maximum number of messages which can be delivered to each recipient.

18. The system of claim 10, wherein each individual recipient from the pool of potential recipients is associated with a recipient profile that specifies the maximum number messages which can be delivered to the respective recipient.

19. A non-transitory computer-readable medium containing instructions that, when executed, cause a computing device to:
determine a first allocation outcome of allocating recipients from a pool of potential recipients to receive messages from a first messaging campaign according to a first allocation algorithm that dictates a first order in which to allocate the recipients to receive the messages from the first messaging campaign, wherein the first messaging campaign:
dictates a set of recipient profile parameters for selecting recipients to receive messages from the first messaging campaign;
determine a second allocation outcome of allocating recipients from the pool of potential recipients to receive messages from first messaging campaign according to a second allocation algorithm that dictates a second order, different than the first order, in which to allocate the recipients to receive the messages from the first messaging campaign, wherein the first allocation outcome and the second allocation outcome are different as a result of the first order and the second order being different;

determine that the first allocation algorithm performed best at achieving the first campaign goal based on an evaluation of the first allocation outcome and the second allocation outcome; and allocate, by the processor, recipients from a second pool of potential recipients to receive messages from a subsequent messaging campaign according to the first allocation algorithm when the subsequent messaging campaign is associated with the first campaign goal.

20. The non-transitory computer-readable medium of claim 19, wherein the instructions further cause the computing device to:

transmit the messages from the first messaging campaign based upon the allocation algorithm that performed best at achieving the campaign goal.

21. The non-transitory computer-readable medium of claim 20, wherein the instructions further cause the computing device to:

receive feedback regarding the transmitted messages from the recipients to which messages were transmitted.

22. The non-transitory computer-readable medium of claim 19, wherein the campaign goal is to deliver the maximum number of messages from the first messaging campaign.

23. The non-transitory computer-readable medium of claim 19, wherein the campaign goal is to deliver messages from the first messaging campaign to the maximum number of recipients.

24. The non-transitory computer-readable medium of claim 19, wherein the campaign goal is to maximize profit.

25. The non-transitory computer-readable medium of claim 19, wherein the instructions further cause the computing device to:

store data indicative of the first allocation outcome and the second allocation outcome.

26. The non-transitory computer-readable medium of claim 19, wherein the first allocation algorithm and the second allocation algorithm dictate a maximum number of messages which can be delivered to each recipient.

27. The non-transitory computer-readable medium of claim 19, wherein each individual recipient from the pool of potential recipients is associated with a recipient profile that specifies the maximum number messages which can be delivered to the respective recipient.

\* \* \* \* \*

UNITED STATES PATENT AND TRADEMARK OFFICE
CERTIFICATE OF CORRECTION

PATENT NO. : 8,799,123 B2  
APPLICATION NO. : 13/096622  
DATED : August 5, 2014  
INVENTOR(S) : Janne Kalliola Page 1 of 1

It is certified that error appears in the above-identified patent and that said Letters Patent is hereby corrected as shown below:

On the title page item (73) Assignee, please change "Cupertiono" to --Cupertino--.

Signed and Sealed this
Twentieth Day of October, 2015

Michelle K. Lee
*Director of the United States Patent and Trademark Office*